Patented Apr. 23, 1940

2,198,208

UNITED STATES PATENT OFFICE 2,198,208

STABILIZED FOOD COMPOSITION AND METHOD OF MAKING SAME

Sidney Musher, New York, N. Y., assignor to Musher Foundation Incorporated, New York, N. Y., a corporation of New York No Drawing. Application August 30, 1939, Serial No. 292,613

10 Claims. (Cl. 99—163)

This invention relates to the stabilization of glyceride oils and particularly to the stabilization of food compositions against oxidative deterioration.

An object of this invention is the retardation of oxidative deterioration and the development of rancidity by simple and economical means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is added to the oxidizable composition such as to a glyceride oil a relatively small proportion of a sugar and a phosphatide or phosphoric acid, and the oil containing the sugar and the phosphatide or phosphoric acid thoroughly admixed therein is then subjected to an elevated temperature in excess of 180° F. and desirably in excess of 220° F. and most preferably in excess of 250° F. whereby marked stabilizing activity is obtained.

This is particularly surprising in view of the fact that sugar itself normally possesses no antioxidant action and certainly is not enhanced in antioxidant action by being subjected to an elevated temperature. Lecithin is thought to possess some antioxidant activity but the antioxidant action of lecithin is recognized as becoming inactivated when heated to in excess of 65° C. or about 150° F.

Moreover, glyceride oils, when subjected to elevated temperatures and particularly to temperatures of about 400° F. become materially reduced in stability and much more subject to the development of rancidity and oxidative deterioration.

On the other hand, in accordance with this invention, where sugar and a phosphatide such as lecithin are added to and thoroughly admixed in finely divided condition in an oil and then the oil containing the sugar and lecithin is subjected to an elevated temperature such as even to as high as 400° F. to 500° F. for a short period of time, marked stabilizing action is obtained.

This stabilizing effect is totally out of proportion to any which would normally be expected from the knowledge of antioxidant action whereby antioxidants are recognized as becoming inactivated when subjected to an elevated temperature and particularly from the knowledge of the normal constituents and reactions of oils, sugar and phosphatides.

Among the sugars that may be utilized in combination with phosphatides in accordance with this invention are particularly the monosaccharides such as dextrose and also any of the other water soluble carbohydrate sugars such as glucose, sucrose, lactose, fructose, maltose, mannose, arabinose or any of the other mono, di, or polysaccharide sugars, raw or refined cane, beet, milk or other sugars, residue or mother liquors obtained during the normal manufacturing operation of the refined sugars, sorghum or blackstrap molasses, etc.

Among the phosphatides are included particularly lecithin or cephalin as obtained as a by-product from the refining of soya bean oil, corn oil, cottonseed oil, etc., or extracted from soap stock materials. Other phosphatides are also included such as the vegetable and animal phosphatides or those obtained from vegetable and animal sources.

This process may be utilized in the treatment and stabilization of a wide variety of oxidizable materials including the glyceride oils such as the vegetable oils and fats including cottonseed oil, corn oil, peanut oil, sesame oil, soya bean oil, olive oil, cocoanut oil, palm kernel oil, etc., animal oils and fats including lard, tallow, oleo oil, cod liver oil, halibut liver oil, mackerel oil, herring oil, etc., the industrial oils such as soap oils, sulfonated oils, etc.

Not only is the oil stabilized, but components of the oils are also stabilized. For example, the vitamin A content of fish liver and other oils, the carotene content of butterfat and similar substances associated with the oils which may be destroyed or reduced by oxidation are highly stabilized by this treatment.

Although this invention relates particularly to glyceride oils, it must be understood this invention may be applied to other oxidizable oils or compositions containing them as to gasoline, lubricating oils to retard gum formation and oxidation, to oil of orange, pharmaceutical oils, etc.

These oils may be in their crude, partially refined or fully refined condition or partially or fully hydrogenated.

The sugar and phosphatide are desirably added to the oil in an amount of less than 5% and preferably under 2%. As little as 0.05% to 0.5% will give desired antioxidant action.

The sugar and phosphatide must be added to and thoroughly admixed in the glyceride oil composition while in finely divided condition before being subjected to the elevated temperature or while the elevated temperature is applied.

Where possible, the oil or food composition containing the added sugar and phosphatide is subjected to a colloid mill or other grinding treatment before or while at the elevated temperature in order to disperse the sugar and phosphatide particles more thoroughly through the oil and thereby obtain more complete antioxidant effect. Where the sugar and phosphatide is itself subjected to an elevated temperature such as to 400° F., for example, allowed to cool, and then added to an oil, it does not have the desired antioxidant effect. The addition must be made to the entire body of the oil or oil containing composition and then subjected to the elevated temperature.

It is not even desirable for the heating to be conducted in a small body of the oil and that oil used as a base for addition to a large body of oil. The most desirable method is for the added sugar and phosphatide to be dispersed in the entire body of oil or oxidizable material to be stabilized, followed by subjecting the oil to the high heat in order to produce the desired interaction or result.

Where the oil containing the sugar and phosphatide is heated to a temperature of about 400° F., for example, the sugar will become charred or burnt in the oil, but this is apparently necessary in order to produce the most potent antioxidant effect. The higher the temperature to which the oil containing the sugar and phosphatide is subjected, the greater is the stabilizing effect, up to a temperature of about 500° F. Where the oil containing composition with the sugar and phosphatide thoroughly admixed therein is subjected to a temperature of 250° F., a definite enhancement in antioxidant effect is obtained, but the antioxidant effect is materially increased where the sugar and phosphatide are subjected to a temperature of about 300° F. to 400° F. in the oil.

Example I

Cod liver oil containing 1% of an equal mixture of dextrose and lecithin dispersed therein became rancid after standing 28 hours at 125° F. Other samples were heated at temperatures indicated for 5 minutes showing the marked increase in stability at the higher temperatures:

Rancid after—
190° F. _____ 36 hours
250° F. _____ 45 hours
300° F. _____ 136 hours
350° F. _____ 244 hours
400° F. _____ 316 hours
450° F. _____ 385 hours The heat treatments need not be prolonged, the protective action being obtained in relatively short periods particularly where the higher temperatures are employed. Normally, the heating may take place by merely heating to the desired temperature and allowing to cool, or by holding at the high temperature for a period of about 10 minutes or more.

The heat treatment referred to will usually be carried out at atmospheric pressure but the use of super or sub-atmospheric pressures may also be employed with satisfactory results.

Example II

Lard containing an equal mixture of dextrose and lecithin in the following amounts, after heating to 400° F. for 5 minutes, was tested at 125° F. as above.

Rancid after—
Containing 0% dextrose-lecithin _____ 12 hours
Containing 0.05% dextrose-lecithin ___ 19 hours
Containing 0.5% dextrose-lecithin ____ 46 hours
Containing 1.0% dextrose-lecithin ____ 135 hours
Containing 5.0% dextrose-lecithin ____ 220 hours Dextrose is preferred for use with the phosphatides and particularly in its anhydrous and finely powdered form. When a dextrose-lecithin combination is used, for example, that combination is considerably more effective than a sucrose-lecithin combination.

Example III

The following tests were conducted with lard, the heated samples having been heated to 400° F. for 5 minutes and all samples having been tested as above at 125° F.

|  | Rancid after— | |
| --- | --- | --- |
|  | Heated | Unheated |
|  | Hours | Hours |
| Lard+0.1% dextrose | 3½ | |
| Lard+0.1% dextrose and 0.1% phosphoric acid | 42 | 10 |
| Lard+0.1% dextrose and 0.1% glycerophosphoric acid | 21 | 8 |
| Lard+0.1% dextrose and 0.2% impure soya lecithin | 85 | 13 |
| Lard+0.1% dextrose and 0.1% pure lecithin | 79 | 8 |

Example IV

The oils were treated as indicated and tested at 125° F. as above.

Rancid after—
Refined soya bean oil containing 0.5%
  of an equal mixture of phosphoric
  acid and lactose without heating___ 23 hours
As above heated to 380° F. for 10
  minutes _____ 102 hours
Refined soya bean oil containing 0.5%
  of the phosphoric acid-lactose mixture which had previously been
  heated before addition to the oil to
  380° F. for 10 minutes and which was
  not heated in the soya oil after addition thereto_____ 16 hours
Cod liver oil containing 1% of an equal
  mixture of lecithin and sucrose without heating_____ 22 hours
As above heated to 340° F. for 12
  minutes _____ 230 hours
Cod liver oil containing 1% of the
  lecithin-sucrose mixture which had
  previously been heated to 340° F. for
  12 minutes before addition to the oil
  and not heated in cod liver oil after
  addition thereto_____ 24 hours There may be treated in accordance with this invention food compositions and particularly glyceride oil containing compositions which are subject to oxidative deterioration and to the development of oxidized and rancid flavors and odors.

In the treatment of oils that are normally processed at elevated temperatures, the sugar and phosphatide may be added to the oil or oil containing composition before the oil is subjected to the elevated temperature, and during the normal processing at the elevated temperature the desired stabilization against rancidity and oxidative deterioration will be obtained.

The sugar and phosphatide may be desirably utilized for addition to oils that are used in the frying of potato chips, nuts, doughnuts, etc., for addition to oils before high temperature vacuum deodorization, for addition to foods processed at elevated temperatures wherein the sugar and phosphatide will produce the desired antioxidant effect, etc.

Where the presence of charred or burnt material in the oil is undesirable, following the heating of the phosphatide and sugar in the oil in which the sugar becomes burnt in that oil, the oil may be filtered to remove the undissolved charred sugar particles and the oil is nevertheless stabilized against oxidative deterioration and rancidity.

Moreover, where the food composition may not be subjected to a temperature as high as 250° F., the sugar and phosphatide may be added to and mixed in the food and then subjected to as high a temperature as possible, but preferably to about 200° F., although a temperature down to as low as 180° F. will still show some desirable enhanced antioxidant effect.

In using combinations of sugar and phosphatide it is preferable to employ approximately equal quantities of sugar and phosphatide so that, for example, a mixture should be prepared comprising 50% of sugar by weight and 50% by weight of lecithin, this being thoroughly mixed in order to form a composite mass readily utilizable for addition to oxidizable oils in order to retard rancidity thereof.

It is also possible to use any moderate variation of the sugar to phosphatide. For practical purposes, mixtures of between 1 and 10 parts of sugar to 1 part phosphatide have shown very good results. Other combinations may be employed such as, for example, there may be utilized from 5% to 95% of sugar and from 95% to 5% of phosphatide. Naturally, the amounts of sugar and phosphatide to be used will be dependent upon the degree of antioxidant action that is desired, and the treatment to be given the oil that is treated.

Among other mixtures that may be employed for addition to oxidizable oils before the high heat treatment are the following:

1. A mixture of equal parts of sucrose and lecithin.
2. A mixture of 5% phosphoric acid and 95% glucose.
3. A mixture of 5% lecithin and 95% blackstrap molasses.
4. A mixture of 30% lecithin and 70% crude cane sugar.

Where it is desired to obtain the sugar and phosphatide in substantially powdered and easily dispersible form so that it may be more readily utilized in aqueous food compositions and particularly where the glyceride oil is contained in the discontinuous phase of such aqueous composition, as in the treatment of cream to be used as such or in the manufacture of butter, there may be prepared a combination comprising about 30% or less of lecithin with 70% or more of sugar.

A sugar lecithin combination preferably using powdered anhydrous dextrose may be prepared using from 80% to 95% of the dextrose and 20% to 5% of lecithin and will give a satisfactory powdered product which may readily be applied to aqueous food compositions.

The use of fillers may also be desirable to produce a powdered mixture, such fillers including powdered skim milk, calcium phosphate, chalk, lime, bone meal, starch and similar products.

Although the phosphatides or phospholipins are most desirable for use in accordance with this invention, phosphoric acid and its derivatives such as glycerophosphoric acid, and much less desirably its salts such as the acid phosphates, for example sodium, potassium or calcium normal or acid phosphates, may be employed for combination with sugar and for addition to the glyceride oil containing compositions in order to retard oxidative deterioration thereof when subjected to an elevated temperature.

Where phosphoric acid is used, a smaller proportion of the phosphoric acid may be employed against the weight of the sugar so that, for example, there may be used 1% of phosphoric acid and 99% of sugar for addition to the oil prior to subjecting it to an elevated temperature in order to retard oxidative deterioration thereof.

It is during the high heat treatment and in the presence of the oxidizable composition, that the reaction takes place whereby the conditions conducive to stabilization are effected. Heat is absolutely necessary as otherwise the desired reaction will not occur.

In the rendering of animal oils and fats from meat or fish stock, such as in the rendering of lard, tallow, oleo oil, cod liver oil, sardine oil, herring oil, menhaden oil, etc., the combination of sugar and phosphatide may be added to the meat or fish stock before subjecting it to the temperature of rendering such as, for example, before lard is rendered from chopped hog fat at from 30 pounds pressure to 60 pounds pressure, for example, or before herring oil is rendered at from 220° F. to 250° F.

The sugar and phosphatide are added to the rendering kettle desirably before the rendering operation has begun and using from 0.1% to 5% of the combination. Not only is the rendered oil such as the lard or herring oil materially stabilized against oxidative deterioration, but the meat scrap or herring meal left following the rendering is also substantially stabilized.

Even where the fatty or oily fish are dried without rendering the fat therefrom, the fish meals will retain their fresh characteristics for much longer periods.

In the rendering of an animal fat such as in the rendering of lard from hogs, the phosphatide combined with the sugar may be of animal origin and may, for example, be derived from hog brains. For example, the phospholipin present in hog brains may be added to the rendering kettle in the amount of from 0.1% to 3% and desirably in an amount of about 1% together with from 0.1% to 3% of sugar such as dextrose, whereby the rendered lard as a result of the high temperature treatment during rendering will be materially stabilized against oxidative deterioration.

Where the animal, meat or fish products such as bacon, fatty mackerel, etc., contain fat on their outer surfaces and which fat is subject to oxidative deterioration, such products may be dipped into a boiling solution of the sugar and phosphatide, for example, in order to effect marked stabilization of the surface fat of the bacon or fatty mackerel or other animal product and thereby very materially reduce surface oxidation and rancidity.

For example, a bacon side may be dipped into hot or boiling water containing dispersed therein a mixture of equal parts of dextrose and lecithin for a period of from 10 to 60 seconds or more and then removed from that solution, allowing all of the excess sugar and lecithin solution to drain off, whereby there is effected marked stabilization of the bacon against the development of rancidity.

Where desired, the combination of sugar and phosphatide or phosphoric acid may be rubbed on the surface of a bacon belly, for example, and then a blow torch or other direct flame or steam may be applied to develop the desired heat in order to burn the sugar and the phosphatide into the surface of the bacon belly whereby marked stabilization of the bacon belly against the development of rancidity is effected.

This treatment develops a sheen or gloss on the surface of the meat or fish product, such as on the bacon belly, that is highly desirable and which further enhances the value of the treated product.

In the treatment of many organic materials already containing either sugars or phosphatides, either the added sugar or phosphatide or both may be so adjusted or regulated that the total sugar and phosphatide content will be from about 0.1% to 5% which is most desirable to produce the stabilization under conditions of high heat treatment.

In addition to using mixtures of sugars and phosphatides or phosphoric acid, it is also possible to use chemical combinations of the sugars and the phosphorus materials. For example, the phosphoric acid ester of glucose may be utilized in place of phosphoric acid and glucose.

Very desirable results may also be obtained where, along with the sugar and phosphorus containing materials there are employed a small proportion, preferably less than 25% against the weight of the combination, of the polycarboxylic aliphatic acids such as tartaric acid, citric acid, malic acid, etc. For example, a combination may be made up comprising 30% lecithin, 40% dextrose and 30% tartaric acid which will give good results when added to oils before subjecting to the elevated temperature.

It is also possible to use these acids with sugar alone although the best results are obtained when the sugar-phosphorus combinations have been employed. Combinations of, for example, equal parts of dextrose and tartaric acid or 5 parts of sucrose to 1 part citric acid may be employed but these other materials do not give as good results as the phosphatides or phosphoric acid when used with the sugars.

It is also possible to include or use other materials. For example, there may be employed a small proportion, less than 5%, of (a) the oil containing seeds and nuts, preferably finely divided and ground and/or in de-oiled condition such as soya flour, soya press cake, sesame press cake, cottonseed flour, cottonseed press cake, cacao press cake, cacao shells, etc., all of which may be added to the oxidizable glyceride oils before the high heat treatment such as 400° F.

It is not satisfactory in the case of any of these materials for the addition to be made following the heating as the high heat treatment is necessary in the presence of the oils in order to develop the desired results.

There may also be employed (b) the spice residues such as cinnamon residue, clove residue, etc. These residues are obtained following the extraction or removal of the essential oil ingredients from the spices such as clove, cinnamon, nutmeg, pepper, mustard, etc. Moreover there may be utilized (c) the substantially crude sugars, such as crude unrefined cane sugar, crude unrefined beet sugar, sorghum molasses, etc.

Among other materials that may be utilized are (d) powdered skim milk, or other milk solids not fat such as condensed skim. Other desirable combinations include (e) mixtures of sugar and fish meal; (f) the water and alcoholic extracts of the finely divided cereals and de-oiled seeds.

This application is a continuation in part of applications, Serial No. 135,169 filed April 5, 1937 and No. 269,913 filed April 25, 1939.

Having described my invention, what I claim is:

1. A method of stabilizing refined cottonseed oil against oxidative deterioration which comprises mixing a sugar and lecithin in approximately equal parts, adding a small amount, less than 5%, of that mixture to the cottonseed oil with agitation, and then heating the cottonseed oil containing the mixture to in excess of 180° F.

2. A method of stabilizing a glyceride oil against oxidative deterioration which comprises mixing a sugar and a phosphatide in approximately equal parts, adding a small amount, less than 5%, of that mixture to the glyceride oil with agitation, and then heating the glyceride oil containing the mixture to in excess of 220° F.

3. A method of stabilizing a glyceride oil composition against oxidative deterioration which comprises providing a glyceride oil composition containing a small amount of a sugar, adding a small amount of a phosphatide thereto, and then heating with agitation to in excess of 220° F., the phosphatide being present in an amount of at least 5% against the weight of the sugar, and the sugar being present in an amount of at least 5% against the weight of the phosphatide.

4. A method of stabilizing a glyceride oil containing composition against oxidative deterioration which comprises adding a small amount of a sugar and also a small amount of a phosphatide to the composition, dispersing them therethrough, and then heating to in excess of 180° F.

5. A method of stabilizing a glyceride oil containing composition against oxidative deterioration, which comprises adding a small amount of a sugar and also a small amount of a phosphorous compound selected from the group consisting of the phosphatides and phosphoric acid to the composition, dispersing them therethrough, and then heating to in excess of 180° F.

6. A method of stabilizing a glyceride oil against oxidative deterioration which comprises adding a small amount of a sugar and also a small amount of a phosphorous compound selected from the group consisting of the phosphatides and phosphoric acid to the composition, dispersing them therethrough and then heating to in excess of 220° F.

7. A glyceride oil containing composition subject to oxidative deterioration, containing a small amount, less than 5%, of about equal parts of added dextrose and added lecithin, said composition when heated to a temperature above 180° F. producing a glyceride oil composition substantially stabilized against oxidative deterioration.

8. A glyceride oil subject to oxidative deterioration, containing a small amount, less than 5%, of about equal parts of added sugar and added lecithin, said composition when heated to a temperature above 220° F. producing a glyceride oil substantially stabilized against oxidative deterioration.

9. A glyceride oil containing composition nornally subject to oxidative deterioration, containing added sugar and added phosphatide, said composition when heated to a temperature above 80° F. producing a glyceride oil composition substantially stabilized against oxidative deterioration, the phosphatide being present in an amount of at least 5% against the weight of the sugar, and the sugar being present in an amount of at least 5% against the weight of the phosphatide.

10. A method of stabilizing a glyceride oil against oxidative deterioration which comprises adding a small amount of a sugar and also a small amount of a phosphatide to the glyceride oil, dispersing them therethrough, and then heating to about 400° F.

SIDNEY MUSHER.